US010464247B2

(12) United States Patent
Lindenfelzer et al.

(10) Patent No.: US 10,464,247 B2
(45) Date of Patent: Nov. 5, 2019

(54) METHOD OF FORMING BLOWN POLYMERIC FOAM FILM

(75) Inventors: Mark E. Lindenfelzer, Milton, MA (US); Jere R. Anderson, Newburyport, MA (US); Samuel E. Dix, Newburyport, MA (US)

(73) Assignee: MuCell Extrusion, LLC, Woburn, MA (US)

( * ) Notice: Subject to any disclaimer, the term of this patent is extended or adjusted under 35 U.S.C. 154(b) by 0 days.

(21) Appl. No.: 13/046,600

(22) Filed: Mar. 11, 2011

(65) Prior Publication Data

US 2012/0228793 A1 Sep. 13, 2012

(51) Int. Cl.

| | |
|---|---|
| ***B29C 47/20*** | (2006.01) |
| ***B29C 48/00*** | (2019.01) |
| ***B29C 48/09*** | (2019.01) |
| ***B29C 48/25*** | (2019.01) |
| ***B29C 48/14*** | (2019.01) |
| ***B29C 55/28*** | (2006.01) |
| ***B29C 48/30*** | (2019.01) |
| ***B29C 48/10*** | (2019.01) |
| ***B29C 48/21*** | (2019.01) |
| ***B29C 48/285*** | (2019.01) |
| ***B29C 48/32*** | (2019.01) |
| *B65D 53/00* | (2006.01) |
| *B29K 105/04* | (2006.01) |
| *B29C 48/295* | (2019.01) |

(52) U.S. Cl.

CPC ...... *B29C 48/0012* (2019.02); *B29C 48/0017* (2019.02); *B29C 48/0018* (2019.02); *B29C 48/09* (2019.02); *B29C 48/10* (2019.02); *B29C 48/146* (2019.02); *B29C 48/1472* (2019.02); *B29C 48/21* (2019.02); *B29C 48/2515* (2019.02); *B29C 48/286* (2019.02); *B29C 48/30* (2019.02); *B29C 48/32* (2019.02); *B29C 55/28* (2013.01); *B29C 48/295* (2019.02); *B29K 2105/041* (2013.01)

(58) Field of Classification Search

USPC ............................... 264/50, 51, 54, 563, 564

See application file for complete search history.

(56) References Cited

U.S. PATENT DOCUMENTS

| | | | | |
|---|---|---|---|---|
| 3,488,746 | A * | 1/1970 | Gilbert | 264/53 |
| 3,634,564 | A * | 1/1972 | Okamoto et al. | 264/54 |
| 4,209,475 | A * | 6/1980 | Herrington et al. | 264/40.1 |
| 4,522,675 | A * | 6/1985 | Sharps, Jr. | 156/244.11 |
| 5,045,254 | A * | 9/1991 | Peelman et al. | 264/48 |
| 5,281,375 | A * | 1/1994 | Konermann | 264/40.3 |
| 5,658,526 | A * | 8/1997 | Rastogi et al. | 264/564 |
| 5,800,758 | A * | 9/1998 | Topolkaraev et al. | 264/154 |
| 5,968,643 | A * | 10/1999 | Topolkaraev et al. | 428/305.5 |
| 6,169,122 | B1 * | 1/2001 | Blizard | B29C 44/08 264/45.9 |
| 6,884,377 | B1 * | 4/2005 | Burnham et al. | 264/50 |
| 2003/0180525 | A1 * | 9/2003 | Strack et al. | 428/323 |
| 2009/0317578 | A1 * | 12/2009 | Rogers et al. | 428/40.1 |

* cited by examiner

*Primary Examiner* — Atul P. Khare

(74) *Attorney, Agent, or Firm* — Wolf, Greenfield & Sacks, P.C.

(57) ABSTRACT

A method of forming a blown polymeric foam film is described herein. As described further below, equipment design (e.g., die design) and processing conditions may be controlled to form blown films having desired characteristics.

20 Claims, 4 Drawing Sheets

METHOD OF FORMING BLOWN POLYMERIC FOAM FILM

FIELD OF INVENTION

The invention relates generally to polymeric foam and more particularly to a method of forming a blown polymeric foam film.

BACKGROUND OF INVENTION

Polymeric foams include a plurality of cells (or voids) formed within a polymer matrix. Microcellular foams (or microcellular materials) are polymeric foams which have very small cell sizes and high cell densities. By replacing solid plastic with voids, polymeric foams use less raw material than solid plastics for a given volume. Thus, raw material savings increase as the density of a foam decreases.

Blown film extrusion is a common technique to make polymer films. The process generally involves extruding a tube of molten polymer through a die and inflating the tube to several times its initial diameter to form a thin film bubble. This bubble is then collapsed and formed into a film.

Blown film generally has a better balance of mechanical properties than cast or extruded films because the film is drawn in both the transverse and machine directions. However, when blowing polymer foam films, it can be challenging to maintain a good cell structure because there is a tendency to distort the foam cells during the blowing process.

Accordingly, a technique for producing a polymeric foam film having a quality cell structure would be desirable.

SUMMARY OF INVENTION

A method of forming a blown polymeric foam film is provided.

In one aspect, a method of forming a polymeric foam blown film is provided. The method comprises conveying a stream of polymeric material and blowing agent in an extruder and extruding the stream through a die to form a polymeric foam extrudate. The method further comprises blowing the extrudate to form a polymeric foam film precursor and processing the polymeric foam film precursor to form a polymeric foam blown film. The blown film has a plurality cells. The average aspect ratio of the cells is less than 5:1 and the average maximum dimension of the cells is less than 150 micron.

Other aspects, embodiments and features of the invention will become apparent from the following detailed description of the invention when considered in conjunction with the accompanying drawings. The accompanying figures are schematic and are not intended to be drawn to scale. In the figures, each identical, or substantially similar component that is illustrated in various figures is represented by a single numeral or notation. For purposes of clarity, not every component is labeled in every figure. Nor is every component of each embodiment of the invention shown where illustration is not necessary to allow those of ordinary skill in the art to understand the invention. All of the patent publications incorporated herein by reference are incorporated herein by references in their entireties. In cases of conflict or inconsistency between the disclosure of an incorporated reference and the present specification, the present specification should control.

DETAILED DESCRIPTION

A method of forming a blown polymeric foam film is described herein. As described further below, equipment design (e.g., die design) and processing conditions may be controlled to form blown films having desired characteristics. For example, the blown films may have small cell sizes and/or small cell aspect ratios. Such blown films can have excellent mechanical properties (e.g., strength) and insulation properties, while providing the materials savings associated with foam materials as compared to solid polymer films. The blown polymer foam films may be used in a variety of applications including seal applications such as closures for packaging.

Figure 1:
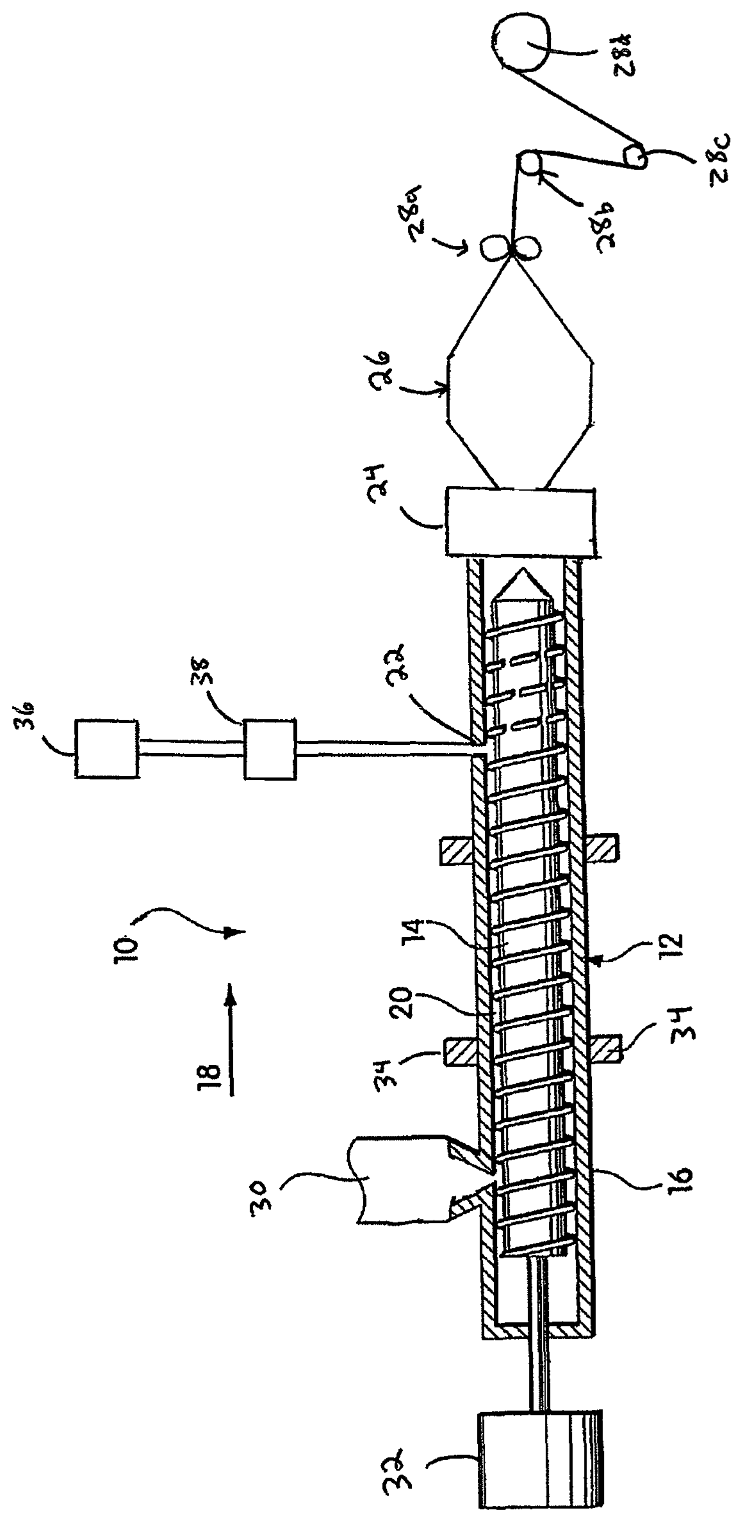
FIG. 1 shows a blown film extrusion system according to an embodiment.

Referring now to FIG. 1, a blown film system 10 is illustrated schematically. The system includes an extruder 12 which houses a screw 14 that rotates within a barrel 16 to convey, in a downstream direction 18, polymeric material in a processing space 20 between the screw and the barrel. A blowing agent is introduced into the stream of polymeric material, for example, through a blowing agent port 22. The stream of polymeric material and blowing agent is extruded through a die 24 fluidly connected to the processing space and fixed to a downstream end of the barrel. As described further below, the die can be configured to form an annular foam extrudate (an example of a polymeric foam film precursor) in the form of a bubble 26. Air may be injected into the bubble (e.g., via a passageway through the center of the die) to provide pressure which causes the bubble to expand. Air entering the bubble replaces air leaving it, so that a relatively constant pressure may be maintained to promote uniform thickness of the film. In the illustrated embodiment, the bubble is pulled away from the die by a series of rollers 28$a$, 28$b$, 28$c$, 28$d$. As the bubble is pulled, it may be cooled from the exterior and interior using cooling devices (e.g., cooling ring) to solidify the blown foam film. In this embodiment, the first set of rollers 28$a$ in the series is used to flatten the bubble thereby forming two flat film layers. The film layers may be slit to form one or two films which can be collected on the last roller.

It should be understood that FIG. 1 depicts a representative blow film system though other types of blown film systems may also be used to produce the polymeric foam film.

The polymeric material may be introduced into the extruder using a standard hopper 30. The screw is connected, at its upstream end, to a drive motor 32 which rotates the screw within the barrel. Positioned along the barrel are temperature control units 34. The control units can be electrical heaters, can include passageways for temperature control fluid, and or the like. Units can be used to heat a stream of polymeric material within the barrel to facilitate melting, and/or to cool the stream to control viscosity. The temperature control units can operate differently at different locations along the barrel, that is, to heat at one or more locations, and to cool at one or more different locations. Any number of temperature control units can be provided. Temperature control units also can be supplied to heat the die to which the extrusion system is connected.

In a typical process, polymeric material in pellet form is introduced into the polymeric processing space from the hopper. The polymeric material is conveyed in a downstream direction as the screw rotates. Heat and shear forces arising from the rotating screw, act to soften the pellets. Eventually, the softened pellets have been gelated, that is, welded together to form a uniform fluid stream substantially free of air pockets.

As noted above, the methods may involve using a blowing agent. In some embodiments and as shown in FIG. 1, a physical blowing agent may be introduced into the stream of polymeric material through the blowing agent port. In other embodiments, a chemical blowing agent may be used. The chemical blowing agent may be used along with, or instead, of a physical blowing agent. The chemical blowing agents may be blended with, or added to, the polymeric material pellets or otherwise introduced into the stream. A blowing agent port may not be utilized when using a chemical blowing agent. Any of a wide variety of known chemical blowing agents may be used.

In embodiments in which a physical blowing agent is used, the physical blowing agent can be introduced from a blowing agent source 36 connected to the blowing agent port. Any of a wide variety of physical blowing agents known to those of ordinary skill in the art such as hydrocarbons, chlorofluorocarbons, nitrogen, carbon dioxide, and the like, and mixtures, can be used. In some preferred embodiments, the source provides carbon dioxide, or nitrogen, or a mixture thereof as a blowing agent. Blowing agents that are in the supercritical state in the extruder may be preferred in some embodiments, particularly supercritical carbon dioxide and/or nitrogen.

In some embodiments carbon dioxide is used in combination with other blowing agents such as nitrogen, and in other embodiments carbon dioxide is used alone with no other blowing agents present. In other embodiments carbon dioxide can be used with other blowing agents so long as the other blowing agents do not materially alter the blowing process. When nitrogen is used, similarly it can be used alone, in combination with another blowing agent (e.g. carbon dioxide) that adds to or changes the blowing agent properties, or in combination with another agent that does not materially change the blowing process.

In embodiments that utilize physical blowing agents, the blown films may be substantially free of residual chemical blowing agents or by-product of chemical blowing agent. Such films may have certain advantages in some applications.

A pressure and metering device 38 typically is provided between the blowing agent source and the port. The metering device can be used to meter the blowing agent so as to control the amount of the blowing agent in the polymeric stream within the extruder to maintain a level of blowing agent at a particular level. In some preferred embodiments, the device meters the mass flow rate of the blowing agent. The blowing agent is generally less than about 10% by weight of polymeric stream and blowing agent; in some embodiments, the blowing agent may be less than about 5% by weight of polymeric stream and blowing agent; in some embodiments, the blowing agent may be less than about 2.5% by weight of polymeric stream and blowing agent; and, in some embodiments, the blowing agent may be less than about 1% by weight of polymeric stream and blowing agent.

When carbon dioxide is used as a blowing agent, it may be possible in some embodiments to use relatively low amounts of blowing agent such as less than about 2.5%, or less than about 1%, by weight of polymeric stream and blowing agent.

When nitrogen is used as a blowing agent, it may be possible in some embodiments to use very low amounts of blowing agent such as less than about 1.0%, less than about 0.5%, or less than about 0.1%, by weight of polymeric stream and blowing agent.

In general, as described further below, use of a nucleating additive (e.g., talc) may enable lower blowing agent percentages.

Although the blowing agent port can be located at any of a variety of locations along the barrel, according to some embodiments it is located just upstream from a mixing section of the screw and at a location of the screw where the screw includes unbroken flights. Blowing agent port configurations which may be suitable in some embodiments have been described in U.S. Pat. No. 6,284,810 which is incorporated herein by reference in its entirety. U.S. Pat. No. 6,284,810 also describes extrusion systems and processes which may be suitable in some embodiments. In some embodiments, one or more blowing agent ports may be utilized which include one or more orifices. However, certain systems may have a single blowing agent port and/or a single orifice.

In some embodiments, a single-phase solution of blowing agent and polymer may be formed in the polymer processing space in the extruder. Formation of a single-phase solution may be particularly conducive to forming a foam structure having small cell sizes, as described further below. The single-phase solution may be nucleated upon being extruded through the die. For example, the solution may experience a rapid pressure drop which induces nucleation when passing through the die.

It should be understood that, in some embodiments, a mixture of blowing agent and polymer which is not a single-phase solution may be extruded through the die. Such embodiments, however, may not be as well-suited for forming small cell foams and/or foams having small aspect ratios.

Figure 2A:
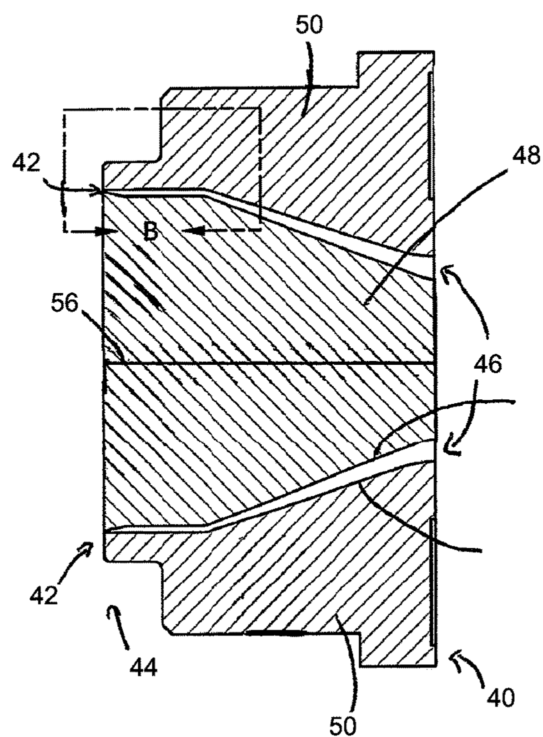
FIG. 2A is a schematic of a die used in connection with the blown film extrusion system of FIG. 1 according to an embodiment.
Figure 2B:
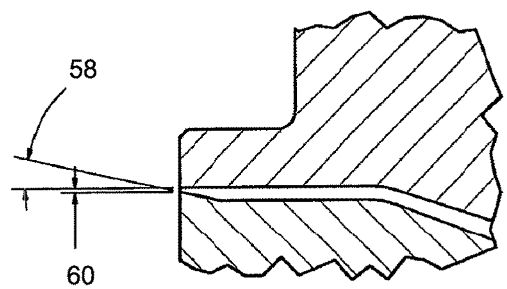
FIG. 2B is a section of the die shown in FIG. 2A.

FIGS. 2A and 2B illustrates die 24 which may be used in connection with the blown film system according to an embodiment. As noted above, the polymer and blowing agent stream is extruded through the die. The die includes an upstream end 40 which can be mounted to the end of the barrel and a die outlet 42 at a downstream end 44 of the die. The die includes an inner passageway 46 which is fluidly connected the polymer processing space in the extruder and extends to the die outlet. In the illustrative embodiment, the inner passageway has an annular shape. The passageway is formed between an inner die body 48 and an outer die body 50 with the inner die body forming an inner wall 52 of the passageway and the outer die body forming an outer wall 54 of the passageway. The dimension between the inner wall and the outer wall may be referred to as die gap 60 (FIG. 2B).

The passageway has a shape and dimensions (die geometry) to control the shape of the extrudate. In certain preferred embodiments, the die geometry may be selected to provide conditions that are conducive to forming the desired cell structure (e.g., low cell aspect ratio, small cell size). For example, in some embodiments, the passageway(s) has an outward taper approaching the die outlet. This may be achieved by the inner wall of the passageway tapering outwardly from a center line 56 of the die. The inner wall may taper outward at an angle 58. Particularly good cell structures have been observed in some embodiments when the outward taper angle is between 4° and 20°; or, between 10° and 15°. In certain preferred cases when the inner wall of the passageway tapers outwardly from a center line, the outer wall of the passageway dos not taper outwardly at as large an angle as the inner wall. In these cases, this results in the formation of a die gap that converges in a downstream direction approaching the die outlet. In some of these cases, the outer wall of the passageway may not taper inwardly or outwardly relative to the center of the die when approaching the die outlet; in some cases, the outer wall tapers inwardly relative to the center of the die when approaching the die outlet; and, in some cases, the outer wall tapers outwardly relative to the center of the die when approaching the die outlet but to a lesser extent (i.e., smaller outward taper angle) than the outward taper of the inner wall.

In embodiments that include a converging die gap, the gap may converge to a dimension of less than or equal to 0.015 inch; in some cases, less than or equal to 0.010 inch; and, in some cases, less than or equal to 0.005 inch. In some of these cases, the gap may converge to a dimension of at least 0.003 inch The above-described die geometry can influence the nucleation of the polymer and blowing agent stream (e.g., single-phase solution of polymer and blowing agent). In particular, the outward taper and converging gap construction has been observed to be very effective in creating nucleation conditions that contribute to the formation of a desired cell structure (e.g., small cell size, small cell aspect ratio) and mechanical properties, as well as high quality surfaces.

As described above, air is generally used to inflate the foam bubble extruded from the die. The air pressure may be selected to provide an appropriate amount of inflation.

After inflation, as described above, the bubble is pulled away from the die in a downstream direction using a suitable pulling mechanism which may be, for example, one or more rollers. The pulling rate and line speed may affect the cell structure, polymer orientation and film thickness since the polymer foam remains in an unsolidified state while being pulled. In general, the pulling mechanism pulls the blown extrudate at a rate sufficient to create the desired foam properties and characteristics. It has been observed that suitable line speeds may be between 50 and 70 meters/minute in some embodiments, though it should be understood that other line speeds are possible.

As described above, the foam extrudate is cooled while being pulled and is eventually flattened to form two flat film layers which may be further processed (e.g., by slitting) to form the blown polymer foam film.

In general, the polymer foam blown film may be formed of any suitable polymeric material. Suitable polymeric materials include polyolefins and, in particular, polyethylene. Blends of more than one polymeric material, such as blends of polyethylenes, may be suitable.

The blown film (and the polymeric material used during the blown film process) may include one or more types of additives. For example, the film (and the polymeric material) may include a nucleating agent. The nucleating agent can be in the form of a particle or powder such as talc. The nucleating agent may be conducive to forming the desired cell structure. It has been observed that using a nucleating agent (e.g., talc) at between about 2.5% and 15% by weight of polymeric material and nucleating agent, or between about 5.0% and 10% by weight of polymeric material and nucleating agent, may be preferred in some embodiments.

As noted above, in some embodiments, the polymeric foam film may have small cell sizes. For example, the average maximum dimension of the cells may be less than 150 micron. As used herein, the maximum dimension of a cell is the largest of the length (l, FIG. 3), thickness (t, FIG. 3) and width (not shown in FIG. 3, transverse to both length and thickness). The maximum dimension can be determined by examining a representative number of cells using SEM analysis. The average maximum dimension is the numeric mean of the maximum dimensions of the representative number of cells. In some embodiments, the average maximum dimension of the cells may be less than 125 micron; in some embodiments, less than 100 micron; and, in some embodiments, less than 75 micron.

Figure 3:
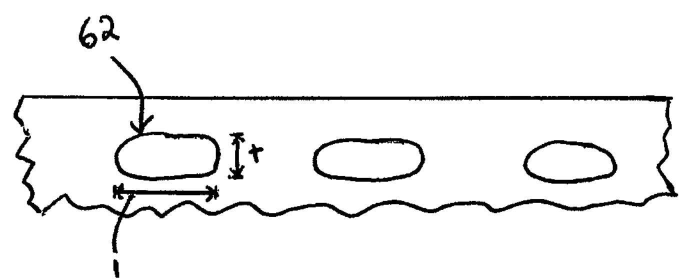
FIG. 3 is a schematic of a portion of a blown film including a plurality of cells according to an embodiment.

FIG. 3 is a schematic of a portion of a blown film including a plurality of cells 62 according to an embodiment. As shown, the cells have some degree of orientation which result from the blowing process. Advantageously, the blown films of the invention may have a small average cell aspect ratio (i.e., ratio of cell length (l) to cell thickness (t)) of less than 5:1. In some embodiments, the average cell aspect ratio may be even smaller such as less than 4:1 or less than 3:1. Such low cell aspect ratios contribute to the excellent mechanical properties that are obtainable in blown film foam of the present invention.

In some embodiments, the blown foam films may have a substantially closed cell structure. This means that a majority of the cells are not interconnected with other cells.

In general, the polymer foam blown films may be produced over a wide range of density. The density of the film may be selected depending on the requirements of the application in which the film is used. The density may be, for example, between 0.05 g/cm$^3$ and 0.90 g/cm$^3$. In some embodiments, the density may be between 0.40 g/cm$^3$ and 0.60 g/cm$^3$.

In general, the polymer foam blown films are relatively thin. The thickness may be typical of a polymer foam blown film and may be, for example, between 40 micron and 150 micron. Advantageously, the processes described herein may enable production of films that are very uniform in thickness. In particular, the die geometries described above are conducive to forming films having such uniformities. In some embodiments, the thickness may vary by less than +/−10% across the width of the blown film.

As noted above, the polymer foam blown films may have a number of desirable characteristics including excellent mechanical properties. The mechanical properties may include a high bending stiffness, high strengths and outstanding sealing capability. The films may also have good insulation properties resulting from their foam structure. The foam structure also enables materials savings as compared to solid plastic blown films. The polymer foam blown films may also have high quality surfaces which may be attractive in appearance and/or may be decorated as desired.

The desirable properties and characteristics enable the polymer foam blown films to be used in a variety of applications. In particular, the polymer foam blown films may be used in seal applications including closures for packaging. In some applications, the polymer foam blown film may be a layer that is combined with other blown film layer(s) to form the final product. For example, the upper and/or lower surface of the polymer foam blown film layer may be adhered to one or more polymer film layers(s). The polymer film layer(s) may be solid polymers, in some cases.

The function and advantage of these and other embodiments of the present invention will be more fully understood from the examples below. The following example is intended to illustrate the benefits of the present invention, but does not exemplify the full scope of the invention.

EXAMPLE

This example illustrates the production of a polymeric foam blown film according to techniques of the invention.

A stream of medium density polyethylene material (MDPE) was created in an extruder. Nitrogen was introduced through a blowing agent port into the stream to form a mixture of nitrogen and MDPE. The percentage of $N_2$ was less than about 0.5% by weight of the mixture. The mixture was mixed within the extruder to form a single-phase solution. The solution was extruded through a die similar to the one illustrated in FIGS. 2A and 2B. The die had a taper angle of between 4° and 20° and the gap at its outlet was less than 0.012 inches. The annular extrudate was blown to form an MDPE foam film precursor. The film precursor was processed, including by a slitting operation, to form a blown MDPE foam film.

Figure 4:
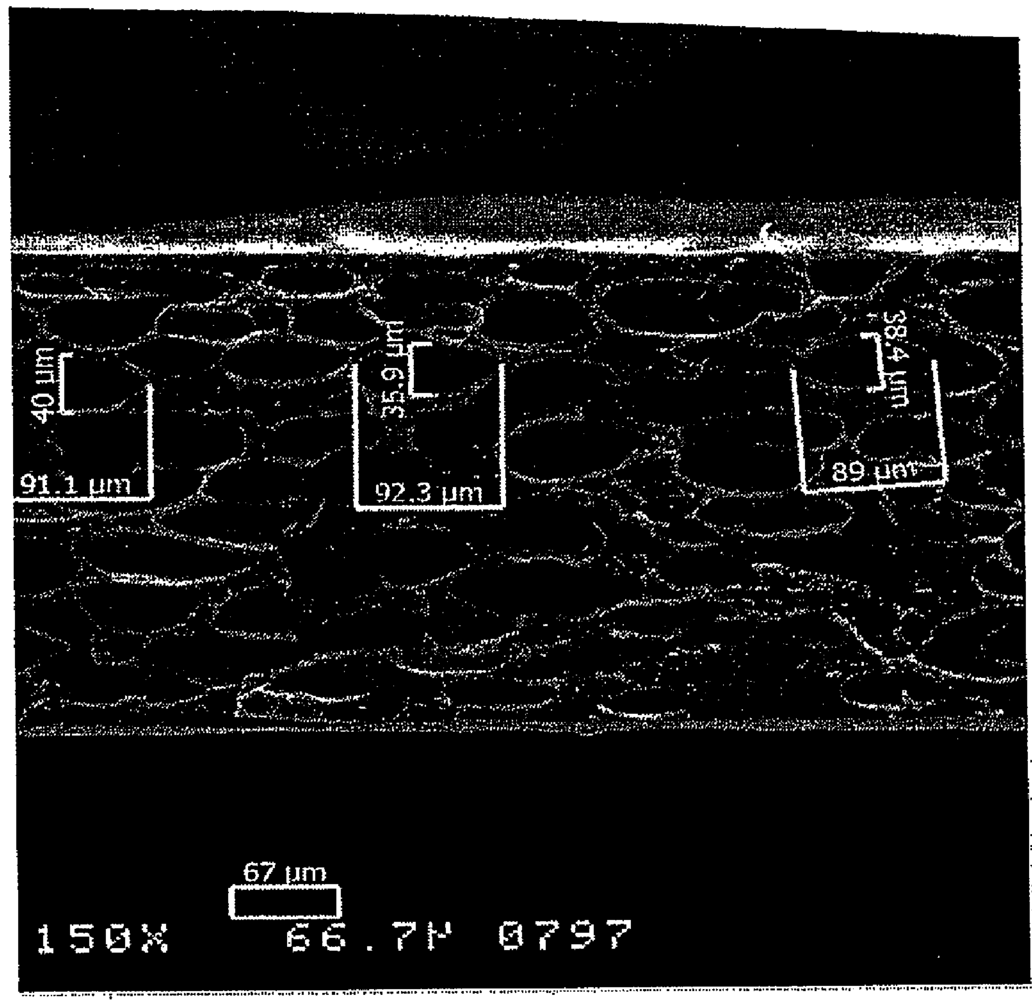
FIG. 4 shows an SEM of a blown film produced according to techniques of the invention as described in the Example.

The blown foam film was characterized using SEM analysis. FIG. 4 is a copy of an SEM photo illustrating a representative section of the film. The average cell size of the blown foam film was determined to be about 60 microns and the average cell aspect ratio was determined to be about 3:1. The blown foam film had a density of about 0.55 g/cm$^3$. The thickness of the film was about 125 micron and the thickness variation was about +/−8%. The foam film had high quality surface and excellent mechanical characteristics.

What is claimed:

1. A method of forming a blown polymeric foam film, the method comprising:

forming a single-phase solution of polymeric material and blowing agent in an extruder;

extruding the solution through a die by passing through an inner die passageway having an outward taper and converging in a downstream direction approaching an outlet of the die so as to form an annular polymeric foam extrudate nucleating upon said extruding;

blowing to expand the extrudate into a blown polymeric foam film precursor; and processing the blown polymeric foam film precursor into a blown polymeric foam film, the blown film having a plurality cells having a length and thickness, wherein the length of the cells is greater than the thickness of the cells such that the average aspect ratio of the cell length to cell thickness is less than 3:1, the average maximum dimension of the cells being less than 150 microns, and wherein the blown polymeric foam film has a density between 0.05 g/cm$^3$ and 0.90 g/cm$^3$.

2. The method of claim 1, further comprising introducing a physical blowing agent, as the blowing agent, into the polymeric material in the extruder to form a stream of the polymeric material and blowing agent in the extruder.

3. The method of claim 2, wherein the physical blowing agent comprises nitrogen.

4. The method of claim 2, wherein the physical blowing agent comprises carbon dioxide.

5. The method of claim 2, wherein the physical blowing agent is present in an amount less than about 2.5% by weight of the polymeric material and blowing agent.

6. The method of claim 1, further comprising introducing a chemical blowing agent, as the blowing agent, into polymeric material in the extruder to form a stream of the polymeric material and blowing agent in the extruder.

7. The method of claim 1, further comprising forming the single-phase solution from a stream of the polymeric material and blowing agent in the extruder.

8. The method of claim 1, wherein the passageway is defined in part by an inner die wall that has an outward taper approaching the die outlet.

9. The method of claim 8, wherein the outward taper of the inner die wall is at an angle of between 4° and 20° with respect to a center line of the die.

10. The method of claim 1, wherein the die has outer and inner walls forming the passageway that converges in a downstream direction approaching the die outlet.

11. The method of claim 1, wherein the converging is to a dimension of less than 0.015 inch at the die outlet.

12. The method of claim 1, wherein the polymeric foam film precursor is in the form of an inflated bubble.

13. The method of claim 1, wherein the average maximum dimension of the cells is less than 100 microns.

14. The method of claim 1, wherein the density is between 0.40 g/cm$^3$ and 0.60 g/cm$^3$.

15. The method of claim 1, wherein the blown film has a thickness uniformity of less than 10%.

16. The method of claim 1, wherein the polymeric material comprises a nucleating agent at between about 2.5% and 15% by weight of the polymeric material and nucleating agent.

17. The method of claim 1, further comprising processing the blown film to form a seal.

18. The method of claim 1, wherein the blown film is a layer of an article that includes at least one additional blown film layer.

19. The method of claim 1, wherein the average maximum dimension of the cells is less than 75 microns.

20. The method of claim 1, wherein the blown polymeric foam film has a thickness between 30 and 150 microns.

* * * * *